US008103528B2

(12) United States Patent
Read et al.

(10) Patent No.: US 8,103,528 B2
(45) Date of Patent: Jan. 24, 2012

(54) SYSTEM AND METHOD FOR ADMINISTERING DYNAMIC SECURITY BENEFITS AND PAYMENTS

(75) Inventors: Katherine Read, Avon, CT (US); Edward Jaworski, West Hartford, CT (US); Steve Robert McConnell, Marlborough, MA (US); Ahmed Shaher, South Windsor, CT (US); Theresa Wadsworth, Windsor Locks, CT (US); Robert Lukawicz, Newington, CT (US); Karen McQueeney Fisher, So. Windsor, CT (US); Richard Balboni, Manchester, CT (US); Bradley D. Molinsky, Bloomfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 348 days.

(21) Appl. No.: 12/150,088

(22) Filed: Apr. 24, 2008

(65) Prior Publication Data

US 2009/0204441 A1    Aug. 13, 2009

Related U.S. Application Data

(60) Provisional application No. 61/003,843, filed on Nov. 20, 2007.

(51) Int. Cl.
*G06Q 40/00* (2006.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 6,343,271 B1 * | 1/2002 | Peterson et al. | 705/4 |
| 7,113,913 B1 | 9/2006 | Davis et al. | |
| 7,395,217 B1 | 7/2008 | Stevens et al. | |
| 7,584,109 B1 | 9/2009 | Allsup | |
| 2004/0049397 A1 * | 3/2004 | Leisure et al. | 705/1 |
| 2005/0182660 A1 | 8/2005 | Henley | |
| 2006/0155590 A1 | 7/2006 | Graham | |
| 2007/0021986 A1 | 1/2007 | Cheung et al. | |
| 2007/0250427 A1 | 10/2007 | Robinson | |
| 2008/0177580 A1 | 7/2008 | Gabriel | |

FOREIGN PATENT DOCUMENTS

EP          1081623 A2      3/2001

OTHER PUBLICATIONS

International Search Report dated Aug. 26, 2008 for related Application PCT/US08/08200.

* cited by examiner

*Primary Examiner* — Eric T Wong
(74) *Attorney, Agent, or Firm* — Howard IP Law Group, PC

(57) ABSTRACT

Disclosed is a novel security benefits product that provides customizable benefits to the purchaser for a variety of different triggering conditions. The product of the present invention may be sold to an individual or a group. The product contains a feature that allows a purchaser to modify and/or vary his or her coverage related to one or more serious health events, such as disability, accident, illness, or death. Additionally, a conversion feature is provided, which allows the insured individual who purchased the product through a third party to maintain the product of the present invention even after the individual is no longer affiliated with the third party.

55 Claims, 8 Drawing Sheets

SYSTEM AND METHOD FOR ADMINISTERING DYNAMIC SECURITY BENEFITS AND PAYMENTS

CROSS REFERENCE TO RELATED APPLICATIONS

This application claims the benefit of U.S. Provisional Application No. 61/003,843, filed on Nov. 20, 2007.

FIELD OF THE INVENTION

The present invention generally relates to providing and administering security benefit payments. More specifically, the present invention relates to a single health and life security product that provides benefits and payments for a number of different health and life events.

BACKGROUND OF THE INVENTION

Individuals and corporations engage in many forms of active and passive risk management to hedge and protect against the risk of certain losses and events. One common and accepted manner in which such risk of loss can be addressed is by transferring the risk of loss from one entity to another. In essence, a contract may be executed which effectively allocates the risk of loss to another party in exchange for predefined amounts of payments or premiums to be paid in exchange for the other party assuming the risk of loss.

More specifically, individuals purchase such contracts or insurance products for a variety of reasons, whether it is simply to ensure payment of funeral services, to provide additional income to the individual's family in case of an accident, or to provide financial security to a loved one. Corporations typically purchase or sponsor insurance products as a financing vehicle for benefit plans or to hedge against other liabilities. Consequently, there are a variety of different types of insurance products available for purchase.

For example, single premium insurance allows a purchaser to pay a one-time fee, or premium, in order to receive a fully funded insurance policy with a predetermined value (i.e. the face value). The benefit under such a policy depends on the individual insured, the premium paid, and the face value of the policy. Typically, the premium payment is deposited into an interest bearing cash value account. The interest rate is compounded at specific intervals, usually annually. The interest rate may change periodically, but a single premium insurance policy typically guarantees a minimum interest rate amount. In return, the insurance company charges a variety of fees, including an annual fee, a mortality risk fee, and an administrative fee.

In addition, insurance companies typically charge a large penalty on a single premium insurance policy if the insured withdraws money from the policy during the first few years. In addition, while the purchaser may take out a loan against the proceeds of this type of policy, interest rate charges may apply. The return of this type of policy is often unfavorable to the purchaser, since the up-front premium usually represents a large portion of the face value of the policy.

Term life insurance provides a predetermined benefit payment for a specifically designated time period, such as for one year, five years, ten years or fifteen years. The insurer only pays the face value if the insured person dies within the time frame in which the policy is in effect. If the insured person lives longer than the term of the policy, the policy expires and pays nothing. Consequently, term life insurance does not build any equity. The principal advantage of term life insurance is that it is relatively inexpensive. However, because of its speculative nature term life insurance is usually purchased as a means of temporary protection or when an individual can't afford the cost of other forms of life insurance.

There are renewable and non-renewable term life policies. With renewable term life insurance, a purchaser automatically re-qualifies and is able to continue the existing policy when the original term is up. However, when a non-renewable policy expires, the individual must take another physical and answer more health questions in order to re-qualify for a new policy.

In an effort to improve the characteristics of term life insurance, insurers offer riders to improve the return characteristics. For example, many term life insurance policies are convertible. Convertible term life policies allow the insured to exchange the term policy into a permanent form of life insurance. However, the costs associated with the conversion are high, lowering the return of this type of insurance policy.

Another type of insurance is permanent life insurance, which provides coverage throughout the entire life of the insured. Premiums are paid throughout the insured's life or for a portion thereof (e.g. for 10 years or 20 years). Further, the cash value portion of a permanent life insurance policy belongs to the insured and may be withdrawn as a loan. Alternatively, a permanent life insurance policy may be surrendered for a predetermined percentage of its face value. Premiums paid into a permanent life insurance policy are allocated between the insurance portion of the policy and the investment or cash portion of the policy. The investment portion of the policy is controlled by the insurance company in their general accounts, and usually consists of stocks, bonds and/or mutual funds. In addition, interest drawn on the investment portion of a whole life policy is usually tax-free until it is withdrawn.

Universal Life insurance is a variation of permanent life insurance. Universal life insurance separates the term life portion of the policy from the investment, or cash portion, of the policy. In addition, the investment portion of the policy is invested in money market funds as opposed to stocks, bonds and mutual funds. The cash value portion of the policy is held in an accumulation account where investment interest is credited to and death benefits are paid from. Consequently, the insured can vary the amount of the annual death benefit because it is contingent upon the underlying variable investments (although these are usually controlled by the insurance company).

There are two general types of universal life insurance. The first type provides a set death benefit for the insured regardless of premiums paid, which keeps the policy in force. The second type sets the death benefit for the insured equal to a set amount plus the current cash value of the policy at the time of the insured's death.

Variable life insurance and variable universal life insurance are also forms of permanent life insurance. As with other insurance policies, part of the premium payment goes toward the term life portion of the policy, part to administrative expenses and part to the investment or cash value portion of the policy. The principal difference between variable life insurance and other types of insurance is that the insured is able to actively choose how to invest the funds in the investment portion of the policy. For example, the insured may select from an array of investments such as stocks, bonds, and mutual funds as long as they are within the insurance companies portfolio. However, variable life insurance may be generally more expensive than other forms of life insurance, and death benefits may fluctuate up or down depending on investment performance.

Universal life insurance and variable life insurance policies address the perceived disadvantages of permanent life insurance. Premiums are flexible and the internal rate of return may be higher because it moves with the financial markets. In addition, mortality costs and administrative charges are known.

However, both forms of insurance have similar disadvantages, which stem primarily from their flexibility. Cash values are not guaranteed and benefit payments can vary because these policies vary based on the timing and amount of premium payments. In other words, these types of insurance polices lapse unless the purchaser has paid a sufficient amount of premium payments to cover both the variable and fixed expenses of the product.

Other types of insurance are well known in the art. For example, disability insurance protects the insured against any loss of income attributable to an accident or sickness that renders the insured incapable of working. Some of the top reasons for becoming disabled are suffering an injury while working, suffering an injury outside of work or developing a disease. Thus, an important form of disability insurance is that provided through employers to cover their employees. There are several subtypes that may or may not be separate parts of the benefits workers' compensation and more general disability insurance policies.

Workers' compensation insurance pays benefits to employees who become unable to work because of a job related injury. However, workers' compensation is in fact more than just income insurance, because it may pay compensation for economic loss (i.e. reimbursement or payment of medical and like expenses), general damages for pain and suffering, and benefits payable to the dependents of workers killed during employment.

General disability insurance offers payments to employees who are unable to work or who are limited in their ability to work because of any injury or illness, even if it is not job-related. Additionally, in some instances general disability insurance may be offered at a negotiated group rate (i.e. as an employer or association sponsored benefit). Meaning, that the benefits of such a policy are similar to what an individual would buy, but they are purchased at a volume discount price.

These general types of disability policies tend to offer rather basic coverage essentially because most people prefer not to purchase any more coverage than they feel they have to, due to increased costs.

Individuals whose employers do not provide benefits, and self-employed individuals who desire disability coverage, may purchase their own policies. Premiums and available benefits for individual coverage may vary considerably between different companies, and for individuals in different occupations. In general, premiums are higher for policies that provide higher monthly benefits, pay the benefits for a longer period of time, and start payments of benefits more quickly following a disability. Premiums also tend to be higher for policies that define disability in broader terms, meaning the policy would pay benefits in a wider variety of circumstances.

In certain circumstances an individual may still be disabled upon the expiration of the maximum duration of benefits and thus unable to financially provide for him or her self as well as any possible dependents. In such circumstances the individual may still fit the qualifications of disability set forth in the insurance contract, however since the duration of benefits is expired the individual will receive no further benefits. Under standard disability plans known in the art, once the maximum duration of benefits has been exhausted, no further payment would be due to the insured individual.

In general, many employers do not offer disability insurance or offer insurance for a short duration. However, now and in the future, disability insurance will prove to be a valuable asset to offer employees. Additionally, critical illness insurance pays a lump sum or a series of payments if the insured is diagnosed with one of the critical illnesses covered by the policy. The types of conditions that are defined as critical illnesses vary and may contain as few as three diagnoses or may contain more than 20 diagnoses.

Critical illness insurance provides financial protection to insured individuals following the diagnosis or treatment of a covered serious illness. The benefits paid can be used for any purpose the insured wishes. In many cases the benefits are used to pay for the cost of treatment, the cost of care, or the cost of aids to recuperation. However, the benefits can also be used to pay other bills, to replace lost income due to a decrease in the ability to earn a sufficient income, and the like.

In general, the younger and healthier a person is, the cheaper it is to obtain life insurance, disability insurance, and the like. Conversely, it is more expensive for an older individual to purchase these types of policies. As a result, the various policies covering illness, accident, disability and death have greatly varying premium payments and payouts. Consequently, an individual who desires protection from one or more of these events must purchase an individual policy for each specific event. In short, if an individual wishes to mitigate the risks associated with an accident, illness, disability, or death, he or she must purchase four separate policies.

However, the probability of each of these events may change over time, rendering one or more of the policies moot and/or more important than another policy. Alternatively, an event may affect a person in a drastic manner yet only trigger one of the aforementioned policies. For example, suppose an individual has disability and illness insurance. If the individual becomes disabled and can not work as a result, the individual can likely only collect on the policy covering disability. It would be advantageous for an individual to have a unified policy that would ensure payment for more than one type of event. This attribute would provide substantial capability for the insurer to align protection with the customers anticipated needs.

Because there is currently no form of integrated insurance that mitigates financial hardship due to an accident, illness, disability, or death, there is a clear need in the art for such an insurance product which incorporates this feature. The present invention overcomes the various deficiencies associated with the prior art by creating a novel insurance product that provides the purchaser with protection against a wide spectrum of events such as an accident, illness, disability, or death.

SUMMARY OF THE INVENTION

The present invention is a platform of integrated risk protection designed to mitigate or eliminate a financial hardship as a result of a serious health event or death. The present invention provides for aggregate benefit levels that are paid pro-rata based on the number of categories or risk protection incorporated into it. The number of aggregate benefit levels and the number of categories of risk protection are variables featured in the present invention. The product may be offered with pre-established combinations of aggregate benefit levels and risk protection categories or on discretionary basis to be determined by the customer.

Importantly, the product of the present invention may be implemented in a variety of forms without departing from the spirit of the present invention. Thus, the product of the present invention may be implemented as an insurance policy, as a security, and/or any other applicable instrument, and/or product, without departing from the spirit of the present invention.

Additionally, in the event that the individual becomes disabled, the present invention may be implemented with a premium waiver feature. This feature of the present invention would allow the insured individual to collect benefits on the disability feature of the present invention without paying premiums to the insurance provider while on disability.

Furthermore, this feature may be extended to other health events covered under the present invention, such as but not limited to illness, accident, or any other type of event that affects the client. Any other health events used when implementing the present invention may contain the aforementioned premium waiver provision, wherein an individual collecting benefits on specific covered health events does not make premium payments while receiving benefits.

Alternatively, the present invention may be implemented without the premium waiver provision altogether. It will be apparent to those skilled in the art that numerous changes may be made in such details without departing from the spirit and the principles of the invention. It should be appreciated that the present invention is capable of being embodied in various other forms without departing from its essential characteristics.

The present invention is designed for purchase by an individual or group through the payment of premiums. The present invention can provide coverage for one or more years with premiums based on an annual attained age, level premiums for a specified number of years (e.g. 5, 10, 15, 20, etc.), or on a paid up basis that enables coverage for life.

There may be certain criteria, which an individual purchasing the product of the present invention may be required to meet, these are known as underwriting criteria. These criteria may include a disease free health history, an age limit, a limit on the amount and/or types of pre existing conditions, or any other criteria deemed necessary by the provider.

Importantly, the above listed criteria are provided for illustrative purposes only and do not serve to list any necessary criteria of the present invention. Furthermore, the criteria presented above are not presented as an exhaustive list of all possible criteria, which an individual purchasing the product of the present invention may be required to meet, other requirements may be used with the insurance product described herein without departing from the spirit of the present invention.

Furthermore, a provider and/or a contracted third party may screen enrollment forms for completeness, follow up with an individual to obtain missing information, and determine if an applicant meets initial underwriting criteria. This may consist in part of medical questions and/or obtaining a report from the Medical Information Bureau ("MIB"), and/or validation from outside sources of insurability of an individual. If the initial underwriting criteria are not met, the applicant may be denied coverage. In an alternative embodiment no such underwriting criteria may be required.

If it is determined that additional medical evidence is required in order to substantiate the accuracy of the information provided by the individual seeking to purchase the insurance product of the present invention, the insurance provider and/or contracted third party administrator notifies the applicant, and provides the appropriate forms for the applicant and/or applicant's physician's office to complete and to submit back to the insurance provider as medical proof of insurability.

The present invention provides protection and benefits that may change over the course of an individual's lifetime. This "transitionary" feature in the present invention is accomplished through the discontinuance and/or reallocation of certain categories of risk protection at predetermined ages or dates. For example, an insured initially protected under 4 categories of health events (death, accident, illness and disability) may elect to have life insurance coverage terminated at age 50, and disability insurance terminated at age 60 while continuing with accident and illness coverage for the remainder of the product term.

This attribute provides substantial capability for the insured to align protection with the customers' anticipated needs. For the issuer of the product, this enables significant opportunity to design products with different price points for different markets, customers, and distributors.

Accordingly, an object of the present invention is to provide an improved insurance product.

Still another object of the present invention is to provide an integrated insurance product with an integrated benefits platform.

Another object of the present invention is to provide an insurance product with a flexible transitionary feature.

Still another object of the present invention is the creation of an insurance product that mitigates the risk associated with multiple serious health events.

Yet another object of the present invention is to provide an insurance product, which mitigates financial hardship due to an accident, illness, disability and/or death.

Another object of the present invention is to provide a product wherein upon canceling at least one category of covered health events the remaining benefit amount at the time of canceling is reallocated to the remaining covered health events based on percentages determined by the client.

Yet another object of the present invention is to provide a product wherein the percentages determined by the client are not equal to each other.

Still another object of the present invention is to provide a product wherein upon canceling at least one category of covered health events the remaining benefit amount at the time of canceling is reallocated to the remaining covered health events based on percentages determined by the provider.

A further object of the present invention is to provide a product wherein the received benefits are subtracted from the total amount of benefits for the at least two categories of health events.

Another object of the present invention is to provide a product wherein the client cancels at least one health event after a predetermined period of time.

Furthermore an object of the present invention is to provide a product wherein the client cancels at least one health event upon the occurrence of a life altering event.

Further an object of the present invention is to provide a product wherein the life altering event is selected from at least one of the following events such as, including but not limited to, marriage, death of spouse, retirement, disability, and illness.

Yet another object of the present invention is to provide a product wherein the client cancels at least one health event at the discretion of the client.

Still another object of the present invention is to provide a product wherein the client cancels at least one health event when specifically given permission by the provider.

Another object of the present invention is to provide a product wherein the reallocating of the percentage of benefits associated with each of the at least two categories of health events is done after a predetermined period of time.

Yet a further object of the present invention is to provide a product wherein the reallocating of the percentage of benefits associated with each of the at least two categories of health events is done upon the occurrence of a life altering event.

Another object of the present invention is to provide a product wherein the reallocating of the percentage of benefits associated with a category of health events is done at the discretion of the client.

Still an object of the present invention is to provide a product wherein the reallocating of the percentage of benefits associated with each of the at least two categories of health events is done when specifically given permission by the provider.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION

Figure 1:
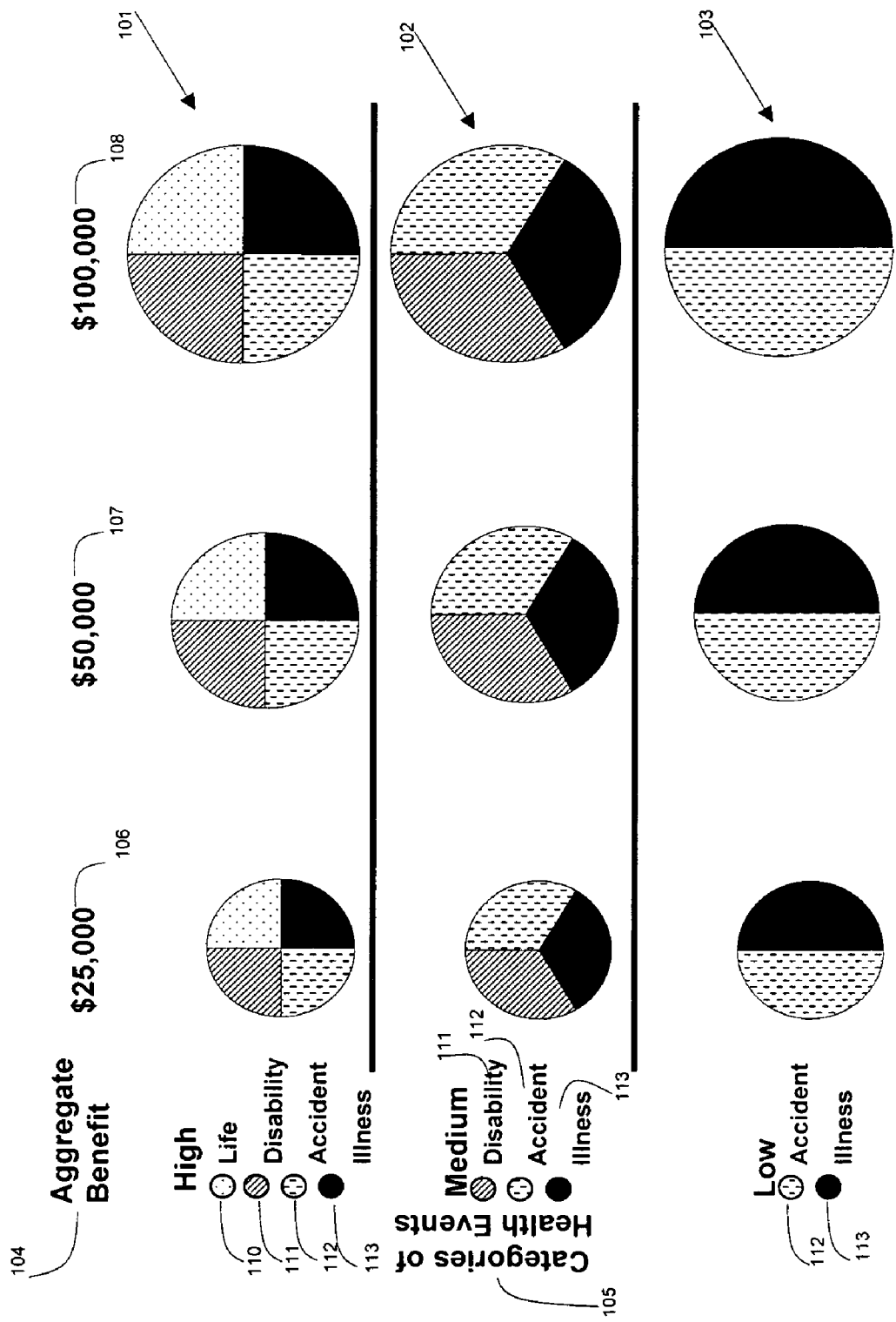
FIG. 1 depicts the benefit levels for varying risk protection factors associated with multiple health events.

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiments for the purposes of disclosure and to provide a basis for the claims herein, which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "product", "insurance policy", "policy", "insurance", "comprehensive insurance" and "insurance product" are meant to limit the application of the invention to one type of insurance instrument. The terms are used interchangeably for convenience and are not intended to limit the scope of the invention.

Similarly, the use of the terms "company", "individual", "purchaser", "insured", "client", "applicant", and "corporation" are not meant to limit the scope of the invention to one type of entity, as any entity or individual can also utilize the present invention.

Additionally, the use of the terms "insurance carrier", "carrier", "service provider", "insurance provider", "policy issuer", "insurance institution", and "insurer" are not meant to limit the scope of the invention to one type of entity. The terms are used interchangeably for convenience.

Finally, the use of the terms "disability", "health events", "critical illness", "death", "covered event", "coverage category", and "accident" are also not meant to limit the scope of the invention as the present invention can be applied to multiple types of insurance options. The following presents a detailed description of a preferred embodiment of the present invention.

The present invention eliminates and/or mitigates financial hardship due to an accident, illness, disability, and/or death. The present invention can be structured as a stand alone product or a rider to a separate product.

Importantly, the product of the present invention may be implemented in a variety of forms without departing from the spirit of the present invention. Thus, the product of the present invention may be implemented as a contract, as an insurance policy, as a security, and/or any other applicable instrument and/or product, without departing from the spirit of the present invention.

The product of the present invention may be underwritten by a service provider such as an insurance company, financial institution, or any other organization capable of underwriting the product of the present invention. The product of the present invention has at least two categories of health events. Each category of health events under the present invention may comprise at least one benefit. However, the product of the present invention may comprise a total amount of benefits, where a predetermined percentage of the total benefits is allocated to each health event.

The present invention provides for the payment of benefits when a covered single event occurs or any combination of covered health events occur or alternatively, the full comprehensive benefit is paid if death occurs. Health events covered by the invention include death, serious illness, disability, accident, or any other type of event that affects the client.

Referring now to FIG. 1, shown are categories of health events 105, which are allotted equally on a pro rata basis. Accordingly, the aggregate benefit of the present invention is paid on a pro rata share as well. The aggregate benefit is the total sum of the benefits payable to a purchaser. In the one embodiment, shown in FIG. 1 there are three levels of aggregate benefits 104, $25,000 106, $50,000 107, and $100,000 108. However, any number of aggregate benefit levels can be utilized in accordance with the present invention.

Several examples are depicted in FIG. 1 as follows: a purchaser who desires 4 levels of protection 101 splits the aggregate benefit evenly (25%) to each health event category, a purchaser who desires 3 levels of protection 102 splits the aggregate benefit evenly (33.33%) to each health event category and a purchaser who desires 2 levels of protection 103 splits the aggregate benefit evenly (50%) to each health event category.

Also shown in FIG. 1 are several combinations of 4 categories of health events 105. As shown in FIG. 1, the four categories are: life 110, accident 112, illness 113, and disability 111. The present invention can, however, accommodate any number of aggregate benefit levels and health event categories.

Additionally, it should be noted that life 110 may be the only category of health events 105 which may have a single risk factor (i.e. cause of death) in accordance with the risk factor structure described above, although other risk factors for life 110 coverage may be added without departing from the spirit of the present invention. Importantly, any other health events may be used with the present product without departing from the spirit of the present invention.

Furthermore, each of the categories of health events 105 may comprise individual risk factors relevant to the specific health event. The risk factors may further be comprised of two categories each, namely the type of health event (e.g. type of illness 113, type of disability 111, etc) and the cause of the health event 105 (e.g. cause of illness 113, cause of disability 111, etc). Other risk factors not listed here may become obvious upon the implementation of the present invention, additional risk factors may be added to or subtracted from each category of health events without departing from the subject matter of the present invention.

The present invention has individual limits for each covered health event, for example, for life 110, accident 112, illness 113, and disability 111. In this embodiment, depleting benefits for one health event has no impact on the potential disbursement of benefits for other health events.

Thus, when the insured individual claims benefits under a category of health events 105, the benefits of each category are subtracted from the total amount of coverage under each category.

The total disbursement of benefits is lowered by the amount of benefits collected by the client to date. Thus, when the total amount of benefits is entirely depleted under each of two or more categories of health events, the insured individual is no longer eligible to receive any benefits under subsequent covered events in the depleted category.

When the insured individual (i.e. client) claims a covered health event an amount up to the appropriate allocated percentage of the total benefits for the entire insurance product is disbursed. Several payout structures may be used with the present invention, such as a single lump sum payment, weekly installments, monthly installments, etc. It will be apparent to those of skill in the art that any payout structure and/or schedule may be used with the insurance product described herein without departing from the spirit of the present invention.

Figure 2:
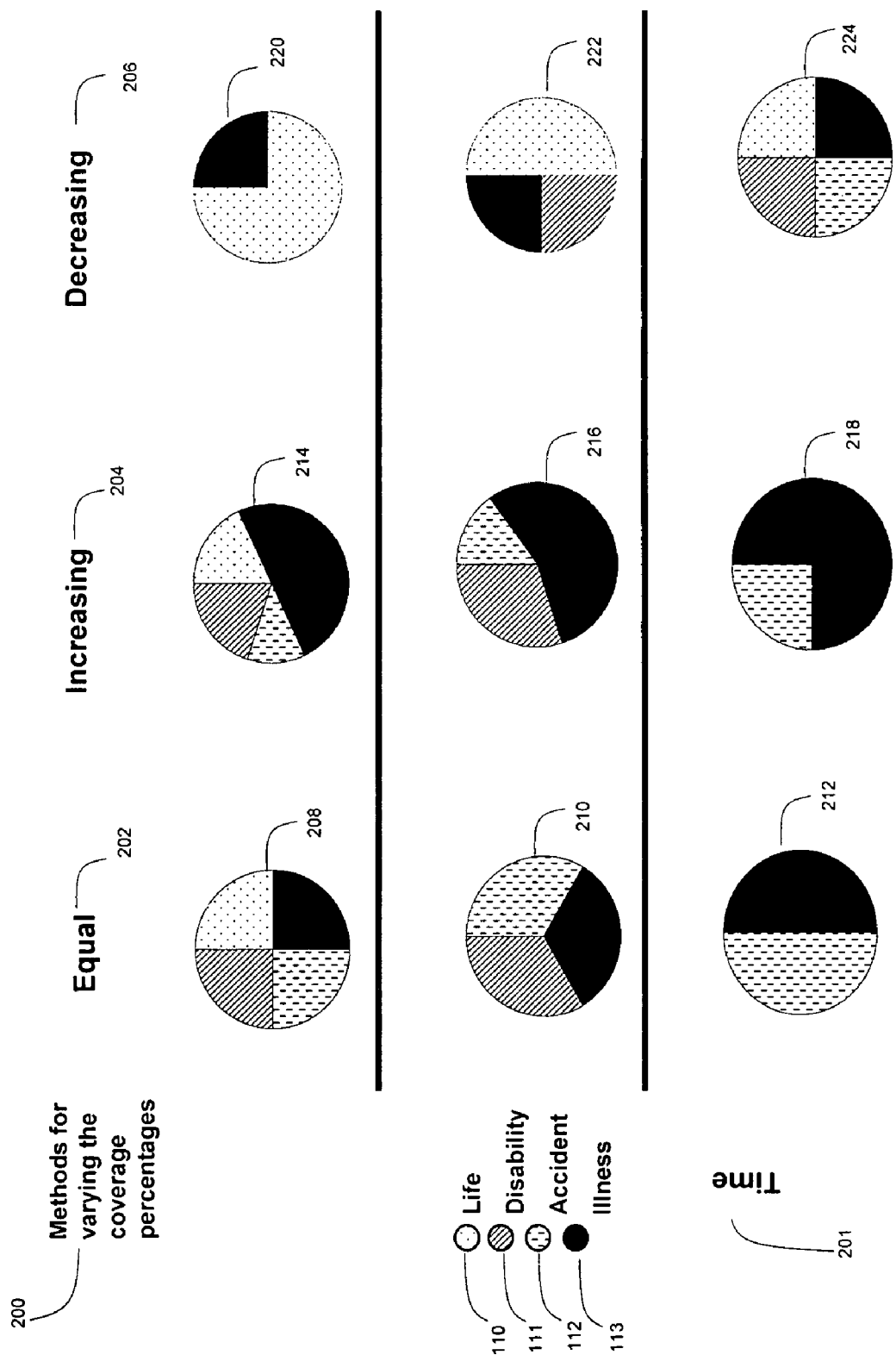
FIG. 2 depicts the variable percentage benefit levels for varying risk protection factors associated with multiple health events.

FIG. 2 depicts the variable percentage benefit levels for varying health event categories over time 201. In this case, the four categories are: life 110, accident 112, illness 113, and disability 111. FIG. 2 shows three possible methods for varying the coverage percentages 200 for benefits allocated to given health events, namely: equal 202, increasing 204, and decreasing 206.

A client may choose to cancel, reduce or reallocate coverage for one or more health events for a variety of reasons. The client may cancel or reallocate coverage for one or more health events after a predetermined period of time, or upon the occurrence of a life altering event such as marriage, death of spouse, retirement, disability, illness, etc. However, any other conceivable reason may be used without departing from the spirit of the present invention.

Upon canceling or reducing the coverage for a category of covered health events the remaining benefit amount at the time of canceling or reducing is reallocated to the remaining covered health events. Reallocating the percentage of benefits associated with each category of health events may be done based on percentages determined by the client, or percentages determined by the insurance provider. These percentages may or may not be equal to each other. Different methods for varying the coverage percentages 200 may be used.

The equal category 202 depicts charts where coverage percentages for benefits are allocated equally among: four health events as depicted in pie chart 208, then allocated among three health events as depicted in pie chart 210, and then allocated among two events as depicted in pie chart 212. Accordingly, the percentages are 25% of benefits for each category in 208, the percentages are 33.33% of benefits for each category in 210, and the percentages are 50% of benefits for each category in 212. Thus, it can be seen that in the equal category 202 the percentage of benefits reallocated to a given health event category is always equal to that of any other category, as coverage for some categories is cancelled, the percentage of benefits is reallocated among the remaining categories.

Additionally, the insured individual may decide to reallocate some of the percentage of benefits for each of the covered health events, or any of the covered health events while not altering the others, this may be done as long as the sum of all of the percentages is 100%.

FIG. 2 shows the increasing category 204 where coverage for one category increases as coverage for some categories is cancelled and/or modified for others over time 201. The increasing category 204 depicts charts where coverage percentages for benefits are allocated among: four health events as depicted in pie chart 214, three health events as depicted in pie chart 216, and two events as depicted in pie chart 218.

The coverage percentages for benefits are allocated in 214 as follows: 12% for accident coverage 112, 20% for disability coverage 111, 50% for illness coverage 113, and 18% for life coverage 110. The coverage percentages for benefits are allocated in 216 as follows: 15% for accident coverage 112, 30% for disability coverage 111, and 55% for illness coverage 113. The coverage percentages for benefits are allocated in 218 as follows: 25% for accident coverage 112, and 75% for illness coverage 113. Thus, it can be seen that in the increasing category 204 the percentage of benefits allocated to illness coverage 113 is periodically increased as coverage for some categories is cancelled and the percentage of benefits is reallocated among the remaining categories.

Furthermore, FIG. 2 shows the decreasing category 206 where coverage for one category decreases as coverage for some categories is added and/or modified for others. The decreasing category 206 depicts pie charts where coverage percentages for benefits are allocated among: two health events as depicted in pie chart 220, three health events as depicted in pie chart 222, and four health events as depicted in pie chart 224.

The coverage percentages for benefits are allocated in 220 as follows: 25% for illness coverage 113, and 75% for life coverage 110. The coverage percentages for benefits are allocated in 222 as follows: 25% for illness coverage 113, 25% for disability coverage 111, and 50% for life coverage 110. The coverage percentages for benefits are allocated in 224 as follows: 25% for life coverage 110, 25% for disability coverage 111, 25% for accident coverage 112, and 25% for illness coverage 113. Thus, it can be seen that in the decreasing category 206 the percentage of benefits allocated to life coverage 110 is periodically decreased as coverage for some categories is added and the percentage of benefits is reallocated among the remaining categories.

As depicted in FIG. 2 and described above the purchaser may choose specific percentages of the total benefit to allocate to each category of health events. These percentages do not necessarily have to be equal. Furthermore, the insured individual may not necessarily have to cancel any categories of health events covered in order to reallocate the percentage of benefits among the covered health events.

Figure 3:
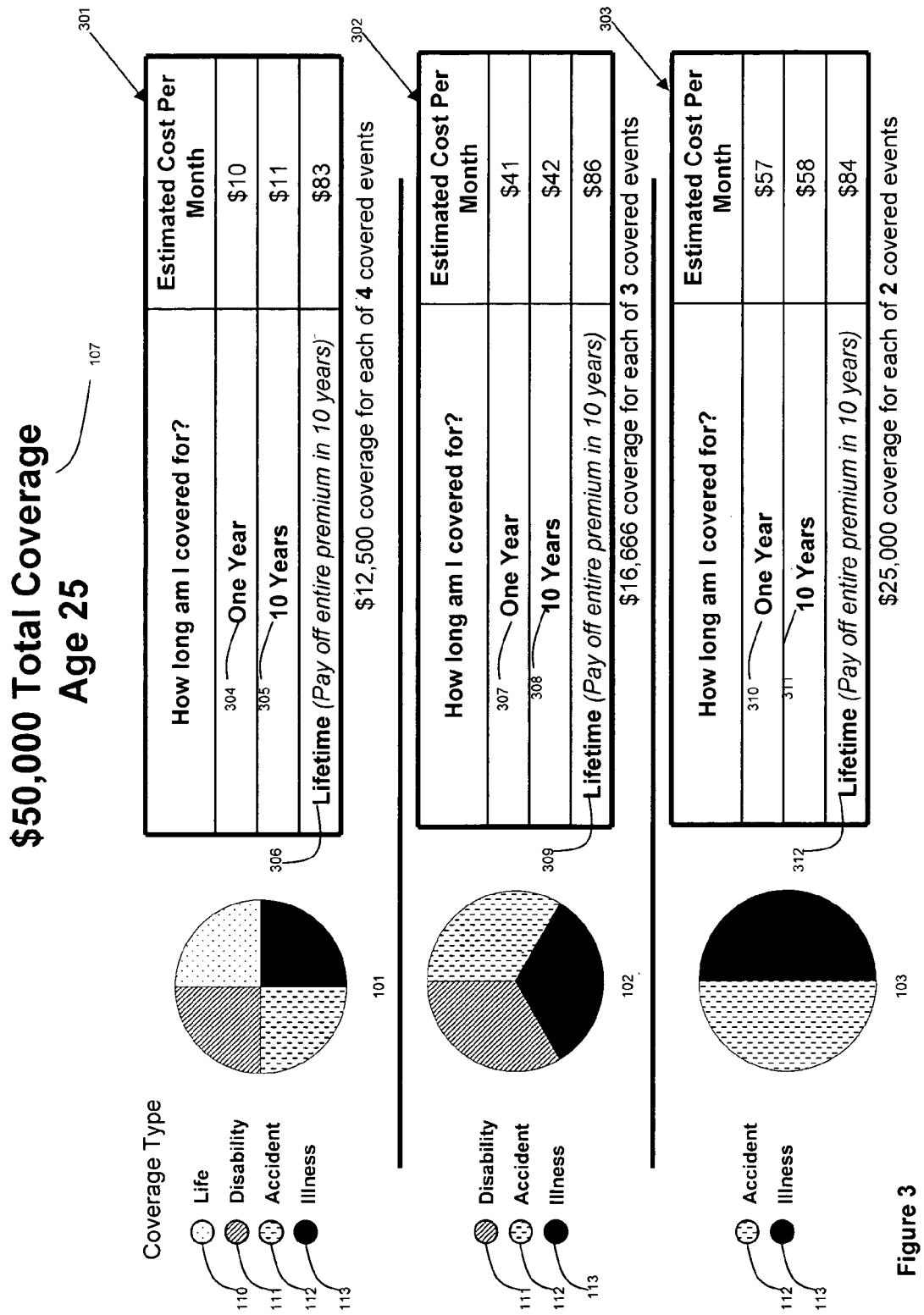
FIG. 3 depicts the benefit levels for varying risk protection factors as well as cost per month for one and ten year periods of coverage.

Turning now to FIG. 3, shown are combinations of 4 categories of health events. In this case, the four categories are: life 110, accident 112, illness 113 and disability 111.

Several examples are depicted using $50,000 of Total Coverage plan 107 as follows: a purchaser at the age of 25 who desires 4 levels of protection 101 splits the aggregate benefit evenly (25%) to each health event, the purchaser in this case may desire to purchase coverage for different durations of time. As depicted in table 301, coverage of $12,500 for each of the four covered events would cost the purchaser: $10 a month for one year of coverage 304, $11 a month for 10 years of coverage 305, and lifetime coverage 306 would cost the purchaser $83 a month, to be entirely paid off in 10 years.

Similarly, a purchaser who desires 3 levels of protection 102 splits the aggregate benefit evenly (33.33%) to each health event category. As depicted in table 302, coverage of $16,666 for each of the three covered events would cost the purchaser: $41 a month for one year of coverage 307, $42 a month for 10 years of coverage 308, and lifetime coverage 309 would cost the purchaser $86 a month, to be entirely paid off in 10 years.

Finally, a purchaser who desires 2 levels of protection 103 splits the aggregate benefit evenly (50%) to each health event category. As depicted in table 303, coverage of $25,000 for each covered event would cost the purchaser: $57 a month for one year of coverage 310, $58 a month for 10 years of coverage 311, and lifetime coverage 312 would cost the purchaser $84 a month, to be entirely paid off in 10 years.

Figure 4:
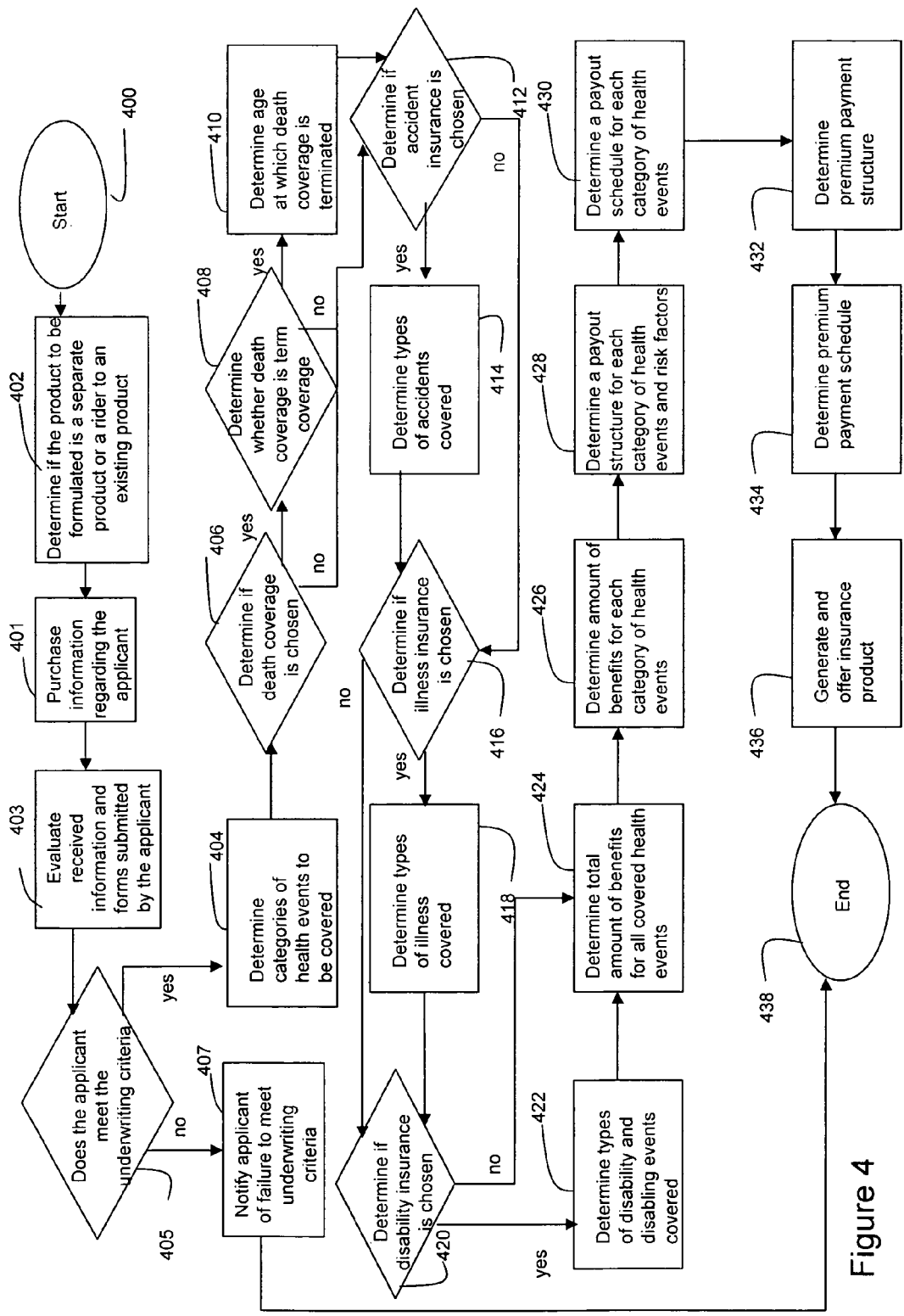
FIG. 4 is a flow chart depicting the steps taken in order to generate and offer a product in accordance with an embodiment of the present invention.

FIG. 4 depicts the steps taken by an insurance provider in order to generate and offer an insurance product to a client. The procedure starts in step 400, first it is determined whether the product to be formulated is a separate product or a rider to an existing product in step 402.

Next, information regarding the applicant may be purchased by the provider in step 401. Information regarding the applicant may be purchased by the insurance provider from a third party source such as the Medical Information Bureau ("MIB"). Additionally, information regarding the applicant's insurability may be sold to a third party for the same reasons. Generally, sold case information and/or individual applicant information is entered in the insurer's and/or contracted third party administrator's front end administrative systems.

Next, the insurance provider and/or a contracted third party evaluates and screens enrollment forms and received information submitted by the applicant in step 403 for completeness. The insurance provider and/or a contracted third party may then follow up with an individual to obtain missing information which, may contain additional proof with respect to medical evidence of insurability. Furthermore, the insurance provider may provide the appropriate forms for the applicant and/or applicant's physician's office to complete and to submit back to the insurance provider as medical proof of insurability.

It is determined if the applicant meets the underwriting criteria of the present invention in step 405. Underwriting criteria is criteria that an individual purchasing the insurance product of the present invention may be required to meet. These criteria may include a disease free health history, an age limit, a limit on the amount and types of pre-existing conditions, or any other criteria deemed necessary by the insurance provider.

Importantly, the above listed criteria are provided for illustrative purposes only and do not serve to list any necessary criteria of the present invention. Furthermore, the criteria presented above are not presented as an exhaustive list of all possible criteria, which an individual purchasing the insurance product of the present invention may be required to meet, other requirements may be used with the insurance product described herein without departing from the spirit of the present invention.

If it is determined in step 405 that the applicant does not meet the underwriting criteria the applicant is notified of failure to meet the underwriting criteria in step 407, and the procedure ends in step 438. If it is determined in step 405 that the applicant does meet the underwriting criteria the procedure continues in step 404.

The categories of health events to be covered are then determined in step 404. It is determined whether death coverage is chosen in step 406, if death coverage is not chosen steps 408 and 410 are skipped and step 412 is performed. If however death coverage is chosen, it is determined whether the death coverage is term coverage (i.e. death coverage provided for a specific period of time) in step 408. If it is determined that the death coverage is not term coverage in step 408, step 410 is skipped and step 412 is performed. However, if it is determined that the death coverage is term coverage in step 408, the age of the client at which death coverage is terminated is determined in step 410.

Subsequently, it is determined whether accident insurance is chosen in step 412, if accident insurance is not chosen step 414 is skipped and step 416 is performed. If accident insurance is determined to have been chosen in step 412, the types of accidents covered are determined in step 414. Next, it is determined if illness insurance is chosen in step 416. If illness insurance is not chosen step 418 is skipped and step 420 is performed. However, if illness insurance is chosen the types of illness covered is determined in step 418.

Furthermore, it is determined whether disability insurance is chosen in step 420. If disability insurance is not chosen step 422 is skipped and step 424 is performed. However, if disability insurance is chosen the types of disability and disabling events covered are determined in step 422.

Subsequently, the total amount of benefits for all covered health events is determined in step 424. The amount of benefits for each category of health events is determined in step 426. Further, the payout structure for each category of health events and risk factors is determined in step 428. Next, a payout schedule for each category of health events is determined in step 430 and a premium payment structure is determined in step 432. Finally, the premium payment schedule is determined in step 434. A bill is then preferably generated by the insurance provider or a contracted third party administrator and sent to the insured individual and/or certificate holder as deemed appropriate by the insurance provider. Premiums may be received directly by the insurance provider. Alternatively, premiums may be received by a contracted third party administrator and then remitted to the insurance provider, as either a gross premium or a premium net of commissions and/or administration fees. The premiums may also be reconciled by the insurance provider. Then the product is offered and generated in step 436, and the procedure ends in step 438.

In the event that the insured individual becomes disabled, the present invention may be implemented with a premium waiver feature. This feature of the present invention would allow the insured individual to collect benefits on the disability feature of the present invention without paying premiums to the insurance provider while on disability.

Furthermore, this feature may be extended to other health events covered under the present invention such as illness or accident. Any other health events used when implementing the present invention may contain the aforementioned premium waiver provision, wherein an individual collecting benefits on specific covered health events does not make premium payments while receiving benefits.

Alternatively, the present invention may be implemented without the premium waiver provision altogether. It will be apparent to those skilled in the art that numerous changes may be made in such details without departing from the spirit and the principles of the invention. It should be appreciated that the present invention is capable of being embodied in various other forms without departing from its essential characteristics.

Figure 5:
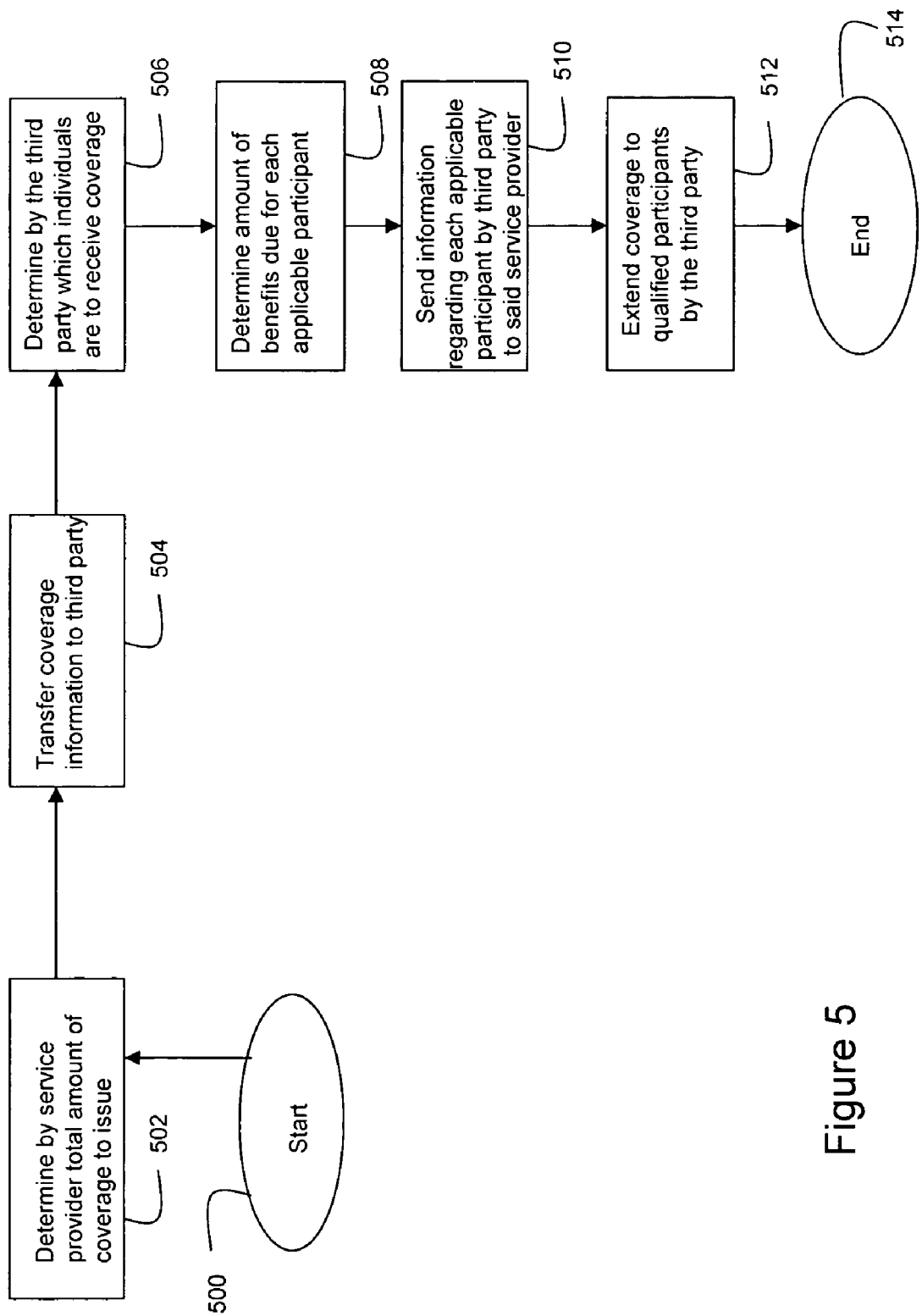
FIG. 5 is a flow chart depicting the steps taken when benefits are administered by a third party to participants in accordance with an embodiment of the present invention.

FIG. 5 shows a flow chart depicting the steps taken when benefits are administered by a third party. The procedure starts in step 500. The service provider determines the total amount of coverage to issue in step 502. Thus, a third party will receive the total given amount as determined by the service provider. Next, the coverage information is transferred to the third party in step 504, this may be done via either purchase of the predetermined amount of coverage or alternatively through any other arrangement without departing from the spirit of the present invention.

Subsequently, the third party determines which individuals are to receive coverage 506. For example, participants may be individuals belonging to a specific affinity group, or employees of the third party, or any individuals who the third party deems fit to receive coverage under the product of the present invention. Next, the amount of benefits due to each applicable participant is determined in step 508.

Information regarding each applicable participant is then sent, by the third party to the service provider in step 510. This information may be any information needed (e.g. date of birth of participant, previous health history, etc) for the service provider to provide adequate coverage to the applicable participants. Finally, the coverage is extended to the qualified participants by the third party in step 512, and the procedure ends in step 514.

Figure 6:
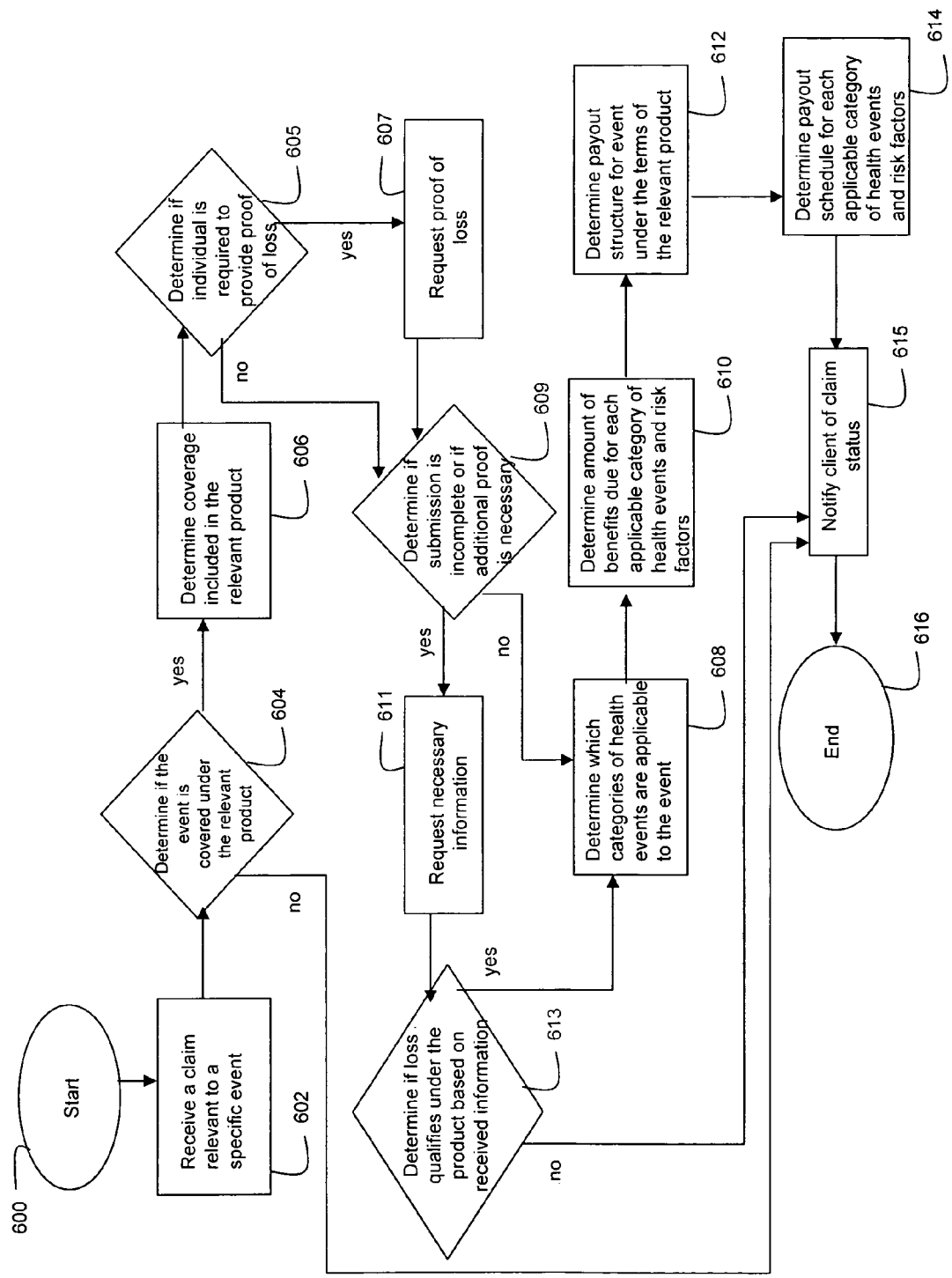
FIG. 6 is a flow chart depicting the steps taken when benefits are administered in accordance with an embodiment of the present invention.

FIG. 6 depicts the steps taken when the benefits of an insurance product generated in accordance with the methods of the present invention are administered by an insurance provider.

The procedure starts in step 600, a claim relevant to a specific event is received in step 602, it is then determined if the event is covered under the relevant product in step 604. If it is determined that the event is not covered under the relevant product, the client is notified of the claim status in step 615 and the procedure ends in step 616. If it is determined that the event is covered, the coverage included in the relevant product is determined in step 606.

When an insured individual files a claim against the insurance provider in the present invention the insurance provider may verify that the insured individual was eligible for coverage and that the premiums were paid to date on the date of the qualifying event. It is determined in step 605 if the individual is required to provide proof of loss. Satisfactory proof of loss may include proof of diagnoses, proof of qualifying event or any other information required by the insurance provider. If the individual is required to provide proof of loss, the proof is requested in step 607, if no proof is required step 607 is skipped and the procedure continues in step 609.

Next, it is determined if the submission is incomplete or if additional information is necessary in step 609. In this case a trained specialized claim team may then adjudicate, however this is not required and the product described herein may be implemented without this feature without departing from the spirit of the present invention.

If more information is required, the insurance provider or the insurance provider's contracted third party administrator (e.g. employer) will request the necessary information in step 611 from the insured, the insured's beneficiary, or directly from the holder of the information. Step 611 may consist of providing the appropriate forms for the applicant and/or applicant's physician's office to complete and to submit back to the insurance provider as medical proof. The insurance provider or the insurance provider's contracted third party administrator then determines if the loss qualifies under the product of the present invention based on the received information in step 613. If the claim is rejected the client is notified of the claim status in step 615 and the procedure ends in step 616. If the claim is not rejected the procedure continues in step 608.

Subsequently, the categories of health events, which are applicable to the claimed event, are determined in step 608, and the amount of benefits due for each applicable category of health events and risk factors is determined in step 610. Next, the payout structure for the claimed event under the terms of the relevant product is determined in step 612. Finally, the payout schedule for each applicable category of health events and risk factors is determined in step 614 and the client is notified of the claim status in step 615. The procedure then ends in step 616.

Figure 7:
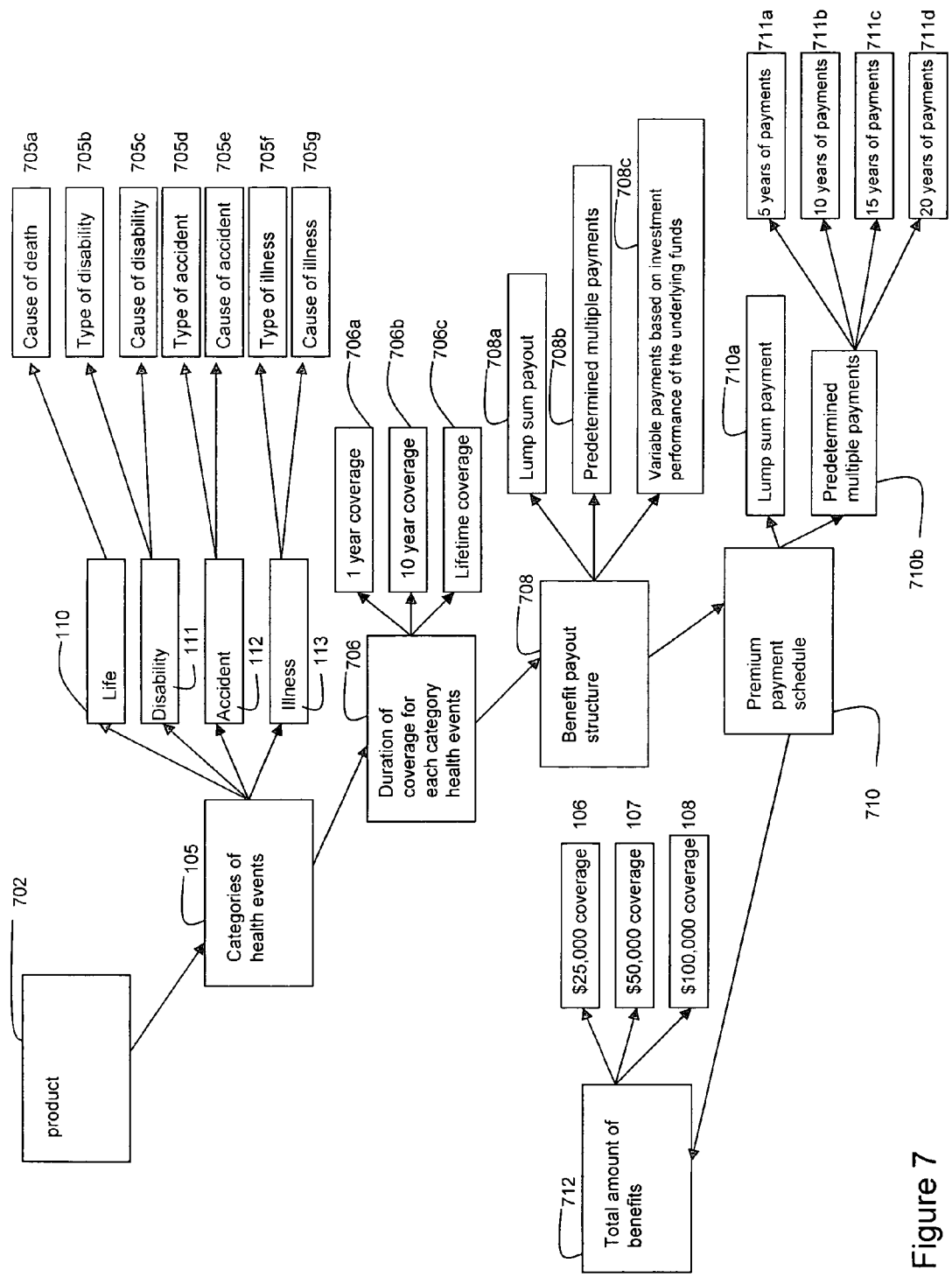
FIG. 7 is a hierarchy diagram depicting the structure of a product generated in accordance with an embodiment of the present invention.

FIG. 7 depicts the hierarchical structure of a product generated in accordance with the methods of the present invention.

The product 702 is composed of the different categories of health events 105. The categories of health events 105 are: life 110, disability 111, accident 112, and illness 113. Each category of health events 105 is further made up of risk factors. The risk factors include: the cause of death 705a for life 110, type of disability 705b and cause of disability 705c for disability 111, type of accident 705d and cause of accident 705e for accident 112, and type of illness 705f and cause of illness 705g for illness 113.

Further, product 702 offers several options of duration of coverage for each category of health events 706. The duration of coverage for each category of health events 706 may be chosen from the following: 1 year of coverage 706a, 10 years of coverage 706b, and lifetime of coverage 706c. However, any length of coverage may be used with the present methods without departing from the subject matter of the present invention.

Additionally, product 702 offers several options for a benefit pay out structure 708. The benefit payout structure 708 may be chosen from a lump sum payout 708a, predetermined multiple payments 708b or installments, or variable payments based on investment performance of the underlying funds 708c. Furthermore, if variable payments based on investment performance of the underlying funds 708c option is chosen the insurance provider may invest the premiums into an investment vehicle and thus provide the yield and original premium sum in the instance of a covered event.

If the relevant claim is approved, the benefit payment is set up in the system. Several payment options are available, as shown in benefit payout structures 708. The lump sum payout 708a may also be paid into an interest bearing checking or draft bank account or through a debit or credit card, set up by the insurance provider in the insured individual's name, which the insured individual can access immediately upon notification of the set-up of the account, and at will any time thereafter.

Furthermore, a payment schedule 710 may be chosen from a lump sum payment 710*a* and predetermined multiple payments 710*b* options. If the predetermined multiple payments 710*b* option is chosen, payment schedule 710 may then be chosen from one of the following: 5 years of payments 711*a*, 10 years of payments 711*b*, 15 years of payments 711*c*, and 20 years of payments 711*d*. Finally, the total amount of benefits 712 may be chosen from $25,000 coverage 106, $50,000 coverage 107, and $100,000 coverage 108.

Figure 8:
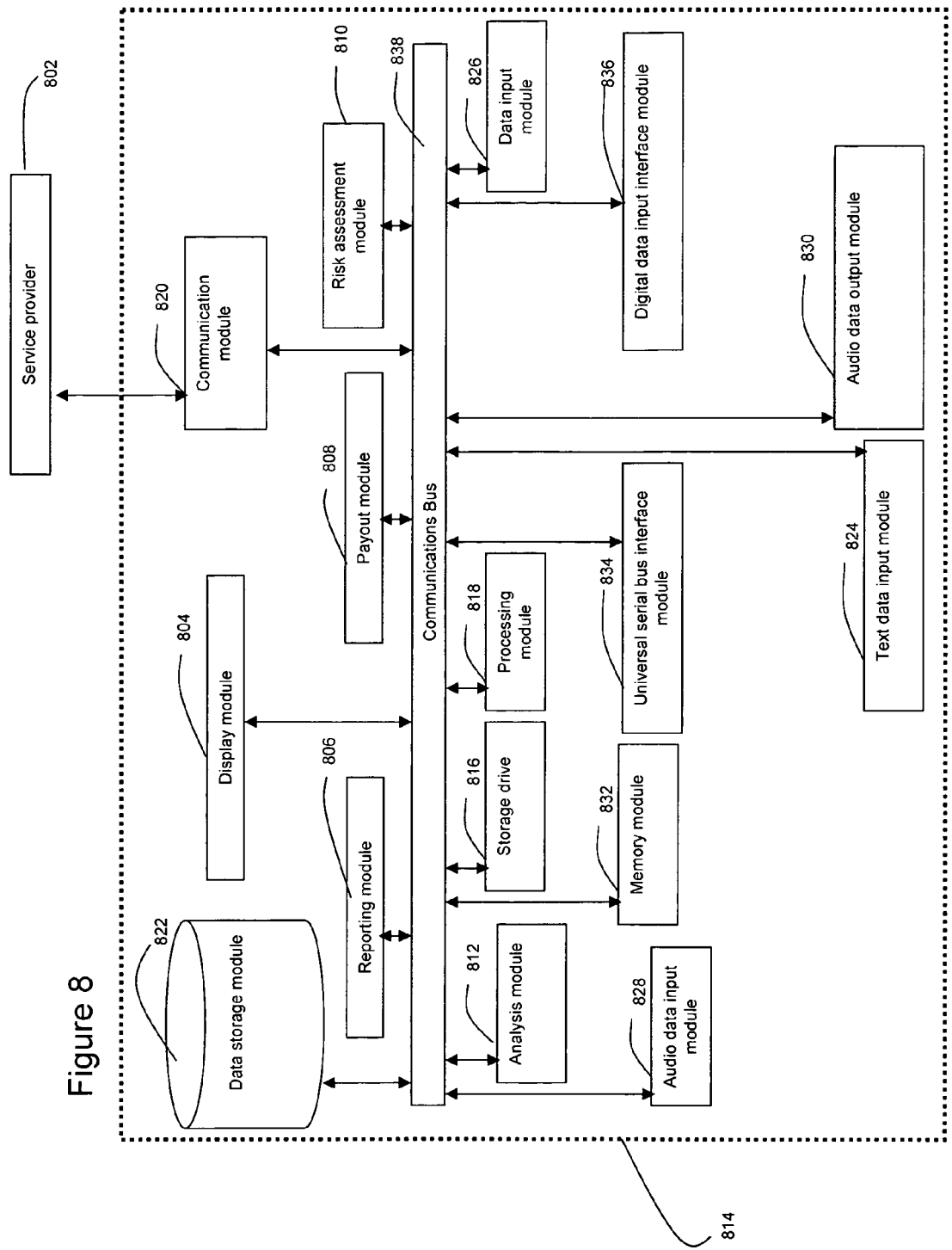
FIG. 8 is a diagram depicting the system on which the methods of the present invention may be implemented in accordance with an embodiment of the present invention.

FIG. 8 depicts an embodiment of a system on which the methods described above may be implemented. The present invention relates to an improved product generating apparatus and method which includes at least one central processing computer or computer network server. The network server includes at least one controller or processing module 818 (CPU or processor), at least one communication module 820 port or hub, at least one random access memory module 832 (RAM), at least one read-only memory module 832 (ROM) and one or more databases or data storage modules 822. All of these latter elements are in communication with the processing module 818 to facilitate the operation of the network server. The network server may be configured in many different ways. For example, the network server may be a conventional standalone server computer or alternatively, the function of the server may be distributed across multiple computing systems and architectures.

The network server may also be configured in a distributed architecture, wherein databases and processing modules 818 are housed in separate units or locations. Some such servers perform primary processing functions and contain at a minimum, a RAM, a ROM, and a general controller or processing module 818. In such an embodiment, these servers are attached to a communications module 820 or port that serves as a primary communication link with other servers, clients or user computers and other related devices. The communications module 820 or port may have minimal processing capability itself, serving primarily as a communications router. A variety of communications protocols may be part of the system, including but not limited to: Ethernet, SAP, SAS™, ATP, Bluetooth, GSM and TCP/IP.

The data storage module 822 may include a hard magnetic disk drive, optical storage units, CD-ROM drives, or flash memory. The data storage module 822 contains databases used in processing transactions and/or calculations in accordance with the present invention, including at least an insurance subscriber database and an insurance database. In one embodiment, database software creates and manages these databases. Insurance related calculations and/or algorithms of the present invention are stored in the data storage module 822 and executed by the processing module 818.

The processing module 818 may comprise a processor, such as one or more conventional microprocessors and possibly one or more supplementary co-processors such as math co-processors. The processing module 818 is in communication with a communication module 820 through which the processor communicates with other devices such as other servers, user terminals or devices.

The communication module 820 may include multiple communication channels for simultaneous communication with, for example, other processing modules, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processing module 818 also is in communication with a data storage module 822. The data storage module 822 may comprise an appropriate combination of magnetic, optical and/or semiconductor memory, and may include, for example, RAM, ROM, flash drive, an optical disc such as a compact disc and/or a hard disk or drive. The processing module 818 and the data storage module 822 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage module 822 may store, for example, (i) a program (e.g. computer program code and/or a computer program product) adapted to direct the processing module 818 in accordance with the present invention, and particularly in accordance with the processes described in detail hereinafter with regard to the processing module 818; (ii) a database adapted to store information that may be utilized to store information required by the program. The data storage module 822 includes multiple records, each record includes fields that are specific to the present invention such as premiums, clients, insurance products, payouts, claims, etc. The program may be stored, for example, in a compressed, an uncompiled and/or an encrypted format, and may include computer-program code. The instructions of the program may be read into a main memory of the processing module 818 from a computer-readable medium other than the data storage module 822, such as from a ROM or from a RAM. While execution of sequences of instructions in the program causes the processing module 818 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing an insurance product by an insurance provider to a client, wherein the insurance product offers coverage for at least one category of covered health events, and providing by the insurance provider to the client a benefit upon the occurrence of the covered health event. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

In the preferred embodiment, all of the modules described herein are operably inter-connected via a central communications bus 838. The communications bus 838 is able to receive information from each of the modules, as well as to transmit information from one module to another. The product administering system 814 further includes a display module 804, and a reporting module 806.

The product administering system 814 additionally includes a payout module 808 for making payments to an insured individual or group for a predetermined period of time as defined by the insurance product.

The system further comprises a risk assessment module 810 for assessing the risks associated with the issuance of the insurance product to a member of a specific demographic. Furthermore, the system comprises an analysis module 812 for analysis of client's behavior, wherein the analysis of client's behavior comprises analysis of reported insurance claims by said client.

Additionally, the product administering system 814 includes: a storage drive 816 for receiving data stored on a storage disc, a processing module 818 for processing digital data received by and contained in the product administering system 814, a communication module 820 for bi-directional communication with external and telecommunications systems, a data storage module 822 for storing and managing digital information, a text data input module 824 for inputting data in the form of text, and a data input module 826 for converting documents and images to digital format and inputting them into the product administering system 814.

Finally, the product administering system 814 includes: an audio data input module 828 for receiving and inputting audio information, an audio data output module 830 for outputting data in audio format (i.e. recorded speech, synthetically generated speech from digital text, etc), a memory module 832 for temporarily storing information as it is being processed by the processing module 818, a universal serial bus interface module 834 for receiving and transmitting data to and from devices capable of establishing a universal serial bus connection, and a digital data input interface module 836 for receiving data contained in external digital storage devices.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications module 820 local to a computing device (or, e.g. a server) can receive the data on the respective communications line and place the data on a system bus for the processing module 818. The system bus carries the data to the memory module 832, from which the processing module 818 retrieves and executes the instructions. The instructions received by the memory module 832 may optionally be stored in memory either before or after execution by the processing module 818. In addition, instructions may be received via a communication module 820 as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, an LCD, voice recognition software, or any other device generally represented by input/output devices required to implement the above functionality. The program also may include program elements such as an operating system, a database management system and "device drivers" that allow the processing module 818 to interface with computer peripheral devices (e.g. a video display, a keyboard, a computer mouse, etc.).

For example, a user provides instructions for administering the product of the present invention. It should be understood that the user may communicate with the computing system directly or indirectly through another party, such as the service provider 802. In the event the user communicates with a service provider 802, the service provider 802 receives and transfers information, to and from the product administering system 814 via the text data input module 824, audio data input module 828, audio data output module 830 and the display module 804. As used herein the data storage module 822 is also referred to as a storage device. The processing module 818 is contained within the product administering system 814, which is coupled to the data storage module 822, the data storage module 822 stores instructions that are utilized by the processor.

The present invention can be configured for distribution in multiple markets, and is capable of being configured for issuance to an individual or group. Alternatively, the present invention can be sold through the workplace as an employer provided benefit, a voluntarily purchased product, or a combination of both.

Further, the present invention can be configured for distribution by financial planners and insurance and other agents. It can also be configured for distribution on a direct basis with an endorsement by a sponsoring association (e.g. an affinity group). The present invention can also be utilized for direct distribution in retail environments like banks, pharmacies, department stores, and the like.

If the present invention is sold through an employer or another group to which the insured individual must belong in order to qualify for the insurance product of the present invention, a conversion and portability feature may be offered to the insured if the insured decides to leave the group or organization through which the insurance product is purchased. The conversion and portability benefit allows the insured individual to maintain their existing insurance product even after leaving the group or organization through which the insurance product is purchased.

The insured individual may be required to meet a pre-established set of criteria in order to qualify for the conversion and portability benefit of the present invention. The insured individual's continued coverage under a carrier sponsored group conversion or portability benefit is still subject to the initial insurance product contract for a specified period of time with payment of premium. Alternatively, new rules may be established after the insurance product is issued through the portability and/or conversion benefit.

The key features of the present invention presented above are described for illustrative purposes only and do not serve to limit the scope of the invention to the specific features listed, nor do they represent an exhaustive enumeration of all aspects of the invention.

Accordingly, well known methods, procedures, and substances for both carrying out the objectives of the present invention and illustrating the preferred embodiment are incorporated herein but have not been described in detail as not to unnecessarily obscure novel aspects of the present invention.

While the present invention has been described with reference to the key features, preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. Thus, the scope of the invention shall be defined solely by the following claims.

Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for administering of data associated with insurance coverage provided by a service provider for a client, the data indicative of coverage of at least two categories of health events, said system comprising:
    a data storage module comprising a memory storage device storing data indicative of an aggregate benefit amount associated with the insurance coverage, the aggregate benefit amount being a maximum benefit amount payable under the insurance coverage; information associated with said at least two categories of health events, the information including data indicative of an identification of each of the two categories of health events, a benefit allocation corresponding to each of said categories of health events, the benefit allocations being fractions of and totaling the aggregate benefit amount, and a payout structure associated with each of said health events; and
    a processing module, comprising a processor and in communication with the data storage module, configured to, in response to receipt of data indicative of a claim, access data from the data storage module, determine benefit eligibility, benefit amount and payout structure, and provide an output signal having data indicative of the benefit amount, the benefit amount for each of the categories of health events having a maximum equal to the corresponding benefit allocation; and
    a payment module configured to, responsive to receipt of the output signal from the processing module pay the benefit in accordance with the data received from the processing module.

2. The computer system according to claim 1, wherein said at least two categories of health events include at least one of the following: death, disability, accident, and illness.

3. The computer system according to claim 2, wherein at least one of said categories of health events further comprises individual risk factors.

4. The computer system according to claim 3, wherein said risk factors are chosen from at least one of the following: cause of illness, type of illness, cause of accident, type of accident, cause of disability, type of disability, and cause of death.

5. The computer system according to claim 3, wherein said risk factors are at least in part used by said processor to determine disbursement of said benefit.

6. The computer system according to claim 1, wherein said benefit amount varies with time.

7. The computer system according to claim 3, wherein said health events include any additional event which is detrimental to the health of said client.

8. The computer system according to claim 1, wherein said processing module is further configured to responsive to receipt of data indicative of a claim based on death, determine a benefit amount equal to: said aggregate benefit amount minus the amount of benefits paid under the insurance coverage up to the date of death.

9. The computer system according to claim 1, wherein said processing module is further configured to reallocate the benefit allocations for one or more of said categories of covered health events while maintaining the aggregate benefit amount based on at least one of the following: percentages determined by said service provider, predetermined percentages, or percentages determined by said client.

10. The computer system according to claim 1, wherein said processing module is further configured to allow said client to elect to cancel coverage for one or more of said categories of health events while maintaining coverage for said at least one category of health events based on at least one of the following conditions: after a predetermined period of time, upon the occurrence of a life altering event, upon the discretion of said service provider, and upon the discretion of said client.

11. The computer system according to claim 10, wherein said processing module is further configured to reallocate said aggregate benefit amount among the other remaining categories of said covered health events equally.

12. The computer system according to claim 1, wherein said processing module is further configured to receive and transmit information regarding said client from and to said service provider and a third party, wherein said third party extends said coverage to said client.

13. The computer system according to claim 12, wherein either said service provider or said third party requires said client to submit proof of insurability as defined by said service provider or said third party.

14. The computer system according to claim 12, wherein said client terminates his/her relationship with said third party, and further continues to receive coverage from said service provider.

15. The computer system according to claim 1, wherein upon payment of a benefit for at least one of said at least two categories of health events, coverage is still provided for each of the other categories of said health events.

16. The computer system of claim 1, wherein the fractions of the aggregate benefit amount are stored as percentages of the aggregate benefit amount.

17. A computer implemented method for administering data indicative of insurance coverage provided by a service provider to a client with coverage of at least two categories of health events the method comprising the steps of:
    receiving by a processor via a communications module data indicative of: a selection of at least two categories of health events, wherein each category of health events comprises at least one benefit; an aggregate benefit amount; a benefit allocation corresponding to each of the at least two categories of health events, the benefit allocations having a total corresponding to the aggregate benefit amount; and a payout structure corresponding to each of the at least two categories of health events;
    storing by the processor in a database having data stored in a tangible data storage medium the selected categories of health events, the aggregate benefit amount, the benefit allocations, the benefit allocations being stored as fractions of the aggregate benefit amount, and the payout structure;

providing an output signal by the processor having data indicative of instructions to furnish to the client an insurance policy in accordance with the insurance coverage, including the selected at least two categories of health events, the aggregate benefit amount, the benefit allocations and the payout structure;

wherein the processor is configured to output a payout schedule for each of the at least two categories of health events in accordance with the benefit allocation and payout structure corresponding to each of the categories of health events, a maximum benefit amount associated with each of the categories of health event being equal to the corresponding benefit allocation.

18. The computer implemented method according to claim 17, wherein at least one of the categories of health events further comprises at least one risk factor.

19. The computer implemented method according to claim 18, wherein the at least one category of health events is chosen from the following: death, illness, accident and disability.

20. The computer implemented method according to claim 19, wherein coverage for death is term coverage set to expire after a predetermined period of time.

21. The computer implemented method according to claim 20, wherein the predetermined period of time is determined by the client.

22. The computer implemented method according to claim 20, wherein the predetermined period of time is determined by the service provider.

23. The computer implemented method according to claim 19, wherein the at least one of the risk factors is illness.

24. The computer implemented method according to claim 19, wherein the at least one of the risk factors is disability.

25. The computer implemented method according to claim 19, wherein the at least one of the risk factors is related to an accident.

26. The computer implemented method according to claim 19, wherein the at least one of the risk factors is cause of death.

27. The computer implemented method according to claim 17, wherein the aggregate benefit amount varies over time.

28. The computer implemented method according to claim 17, wherein more than one category of health events applies to a single event.

29. The computer implemented method according to claim 17, wherein the duration of coverage for the at least one category of health events to be covered is chosen by the client.

30. The computer implemented method according to claim 29, wherein the duration of coverage for the at least one category of health events to be covered is chosen from: 1 year of coverage, 10 years of coverage, or a lifetime of coverage.

31. The computer implemented method according to claim 17, wherein the payout structure is chosen from the following: lump sum payout, predetermined multiple payments, or variable payments based on performance of investment made by the service provider.

32. The computer implemented method according to claim 31, wherein the pay out schedule for the predetermined multiple payments is chosen from a variable number of payments.

33. The computer implemented method according to claim 17, wherein data related to the coverage is exchanged with a third party which extends coverage to the client, wherein the third party receives and transmits information regarding the client from and to the service provider.

34. The computer implemented method according to claim 33, wherein either the service provider or the third party require the client to submit proof of insurability as defined by the service provider or the third party.

35. The computer implemented method according to claim 33, wherein the client terminates his/her relationship with the third party, and further continues to receive coverage from the service provider.

36. The computer implemented method according to claim 17, wherein the pay out structure is chosen separately for each of the at least two categories of health events to be covered.

37. The computer implemented method according to claim 18, wherein the pay out structure is the same for each of the at least two risk factors.

38. The computer implemented method according to claim 17, wherein the processor is further configured to, responsive to receipt of data indicative of payment to the client of at least one of the benefits data indicative of nonpayment of premiums from the client, store data indicative of the coverage remaining in force.

39. The computer implemented method according to claim 17, wherein the processor is further configured to subtract from the aggregate benefit amount an amount of benefits paid.

40. The computer implemented method according to claim 17, wherein upon payment of a benefit for at least one of said two categories of health events, coverage is still provided for the other of said health event.

41. The computer implemented method of claim 17, wherein the fractions of the aggregate benefit amount are stored as percentages of the aggregate benefit amount.

42. A computer implemented method for administering data associated with insurance coverage provided to a client with coverage of at least two categories of health events by a service provider, the method comprising the steps of:

receiving by a processor via a communications module data indicative of:

a selection of at least two categories of health events to be covered, wherein each category of the health events comprises at least one benefit; an aggregate benefit amount; an allocation of the aggregate benefit amount to each of the selected categories of health events, the allocation being a fraction of the aggregate benefit amount to each of the selected categories; and a payout structure for each of the selected categories of health events;

storing by the processor in a database data indicative of the selected categories of health events, the aggregate benefit amount, the allocation; and providing an output signal by the processor having data indicative of instructions to furnish to the client an insurance policy in accordance with the insurance coverage, including the selected categories of health events, the aggregate benefit amount, and the allocation;

wherein the processor is configured to store in the database, responsive to receipt of data indicative of instructions received from the client, data indicative of a reallocation of the aggregate benefit amount associated with each of the at least two categories of coverage;

wherein the benefit amount for each of the two categories of coverage is changed responsive to and in accordance with the reallocation of the aggregate benefit amount.

43. The computer implemented method according to claim 42, wherein the client is capable of canceling coverage for the at least one category of health events.

44. The computer implemented method according to claim 43, wherein upon the canceling of coverage of the at least one category of health events, the remaining benefit amount at the time of canceling is reallocated to the remaining categories of health events.

45. The computer implemented method according to claim 44, wherein upon canceling coverage for the at least one category of health events the remaining benefit amount at the time of canceling is reallocated to the remaining coverage for the categories of health events based on percentages determined by the client.

46. The computer implemented method according to claim 45, wherein the percentages determined by the client are not equal to each other.

47. The computer implemented method according to claim 44, wherein upon canceling coverage for the at least one category of health events the remaining benefit amount at the time of canceling is reallocated to the remaining categories of health events based on percentages determined by the service provider.

48. The computer implemented method according to claim 44, wherein the client cancels coverage for the at least one health event upon the occurrence of a life altering event.

49. The computer implemented method according to claim 48, wherein the life altering event is selected from at least one of the following: marriage, death of spouse, retirement, disability, and illness.

50. The computer implemented method according to claim 44, wherein the client cancels coverage for the at least one health event at the discretion of the client.

51. The computer implemented method according to claim 44, wherein the client cancels coverage for the at least one health event upon being given permission by the service provider.

52. The computer implemented method according to claim 42, wherein after a predetermined period of time the percentage of benefits associated with each of the at least two categories of health events may be reallocated.

53. The computer implemented method according to claim 44, wherein upon the occurrence of a life altering event the percentage of the benefit associated with each of the at least two categories of health events may be reallocated.

54. The computer implemented method according to claim 42, wherein upon payment of a benefit for at least one of said two categories of health events, coverage is still provided for the other of said health events.

55. The computer implemented method of claim 42, wherein the fractions of the aggregate benefit amount are stored as percentages of the aggregate benefit amount.

* * * * *